United States Patent
Huang et al.

(10) Patent No.: US 11,022,016 B2
(45) Date of Patent: Jun. 1, 2021

(54) EXHAUST GAS TREATMENT SYSTEM AND METHOD WITH IMPROVED REGENERATION

(71) Applicant: Deere & Company, Moline, IL (US)

(72) Inventors: Shyan-Cherng Huang, Cedar Falls, IA (US); Danan Dou, Cedar Falls, IA (US); Eric J. Hruby, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 97 days.

(21) Appl. No.: 16/239,247

(22) Filed: Jan. 3, 2019

(65) Prior Publication Data
US 2020/0217234 A1   Jul. 9, 2020

(51) Int. Cl.
*F01N 9/00* (2006.01)
*B01D 46/00* (2006.01)
(Continued)

(52) U.S. Cl.
CPC ......... *F01N 9/002* (2013.01); *B01D 46/0061* (2013.01); *F01N 3/027* (2013.01); *F01N 3/0253* (2013.01); *B01D 46/0027* (2013.01); *B01D 53/9431* (2013.01); *B01D 53/9454* (2013.01); *B01D 2279/30* (2013.01); *F01N 3/035* (2013.01); *F01N 2510/0682* (2013.01); *F01N 2900/1404* (2013.01)

(58) Field of Classification Search
CPC ........ F01N 3/023; F01N 3/0253; F01N 9/002; F01N 2510/068; F01N 2510/0682
See application file for complete search history.

(56) References Cited

U.S. PATENT DOCUMENTS

| 9,091,191 B2 | 7/2015 | Karlsson et al. |
| 2011/0212008 A1* | 9/2011 | Punke ............ F01N 3/035 423/213.5 |
| 2016/0053648 A1 | 2/2016 | Iojoiu et al. |

FOREIGN PATENT DOCUMENTS

| DE | 102018106420 A1 | 9/2018 |
| EP | 3199220 A1 | 8/2017 |
| WO | WO2012105890 A1 | 8/2012 |

OTHER PUBLICATIONS

European Search Report issued in counterpart application No. 20150192.1 dated Sep. 23, 2020 (10 pages).

* cited by examiner

*Primary Examiner* — Jonathan R Matthias
(74) *Attorney, Agent, or Firm* — Michael Best & Friedrich LLP

(57) ABSTRACT

An exhaust gas treatment system for an internal combustion engine includes an exhaust gas pathway configured to receive exhaust from the engine, a diesel particulate filter (DPF) element positioned in the exhaust gas pathway to capture particulate matter from the exhaust, and a regenerator operable to increase a temperature of the exhaust that passes through the DPF element. The system also includes a controller configured to selectively operate the exhaust gas treatment system in a first mode in which the regenerator is inactive such that a temperature of the exhaust is within a first range, a second mode in which the regenerator is activated to increase the temperature of the exhaust to a first target temperature beyond the first range, and a third mode in which the regenerator is activated to increase the temperature of the exhaust to a second target temperature greater than the first temperature.

17 Claims, 7 Drawing Sheets

(51) Int. Cl.
  *F01N 3/025* (2006.01)
  *F01N 3/027* (2006.01)
  *B01D 53/94* (2006.01)
  *F01N 3/035* (2006.01)

EXHAUST GAS TREATMENT SYSTEM AND METHOD WITH IMPROVED REGENERATION

BACKGROUND

The present disclosure relates to exhaust systems and more particularly to diesel exhaust gas treatment systems.

Diesel exhaust is typically subject to emissions regulations covering a variety of emission components, including particulate matter and nitrogen oxides ($NO_x$). A variety of exhaust treatment devices have been developed to reduce these emission components. For example, a selective catalytic reduction (SCR) element can be used to convert the $NO_x$ present in exhaust gas into other compounds, such as nitrogen, water, and carbon dioxide.

Typically, diesel exhaust fluid (DEF)—a solution of urea and deionized water—is injected upstream of the SCR element to provide ammonia, which acts as a reducing agent and reacts with the $NO_x$ in the presence of the SCR catalyst in accordance with Equation (1):

$$NO+NO_2+2NH_3 \rightarrow 2N_2+3H_2O \qquad (1)$$

The $NO_x$ and ammonia are thus converted into nitrogen and water. As evident from Equation (1), the optimal stoichiometric ratio for this reaction includes equal parts of nitric oxide (NO) and nitrogen dioxide ($NO_2$).

Particulate matter is another component of diesel exhaust emissions being targeted with increasingly stringent regulations. A diesel particulate filter (DPF) can be used to trap diesel particulate matter. During operation, trapped soot on the filter element can be oxidized through a process commonly referred to as passive regeneration. In particular, during passive regeneration, the carbon-based soot reacts with $NO_2$ in accordance with Equation (2) and Equation (3):

$$C+2NO_2 \rightarrow CO_2+2NO \qquad (2)$$

$$C+NO_2 \rightarrow CO+NO \qquad (3)$$

As evident from Equations (2) and (3), $NO_2$ also plays an important role in soot oxidation.

To provide enough $NO_2$ for $NO_x$ reduction and soot oxidation, some emissions systems include a diesel oxidation catalyst (DOC) upstream of a SCR and a DPF element. The DOC includes one or more precious group metals (e.g., platinum, palladium, etc.) that act as a catalyst to reduce emission of carbon monoxide, hydrocarbons, and volatile organic compounds. The DOC also oxidizes NO to $NO_2$, which promotes faster SCR reactions and enhances passive regeneration.

In typical exhaust treatment systems with a DPF, passive regeneration alone may not be sufficient to manage soot accumulation on the filter element. Accordingly, such systems may periodically employ active regeneration. During active regeneration, a temperature of the exhaust gas is increased to a target elevated temperature, typically at least 600 degrees Celsius, and maintained at the elevated temperature for a predetermined time period (e.g., 30 minutes). At high temperatures, carbon-based soot reacts with oxygen in accordance with Equation (4) and Equation (5):

$$C+O_2 \rightarrow CO_2 \qquad (4)$$

$$2C+O_2 \rightarrow 2CO \qquad (5)$$

The reactions of Equations (4) and (5) during active regeneration will thus restore the DPF to a clean state.

Raising the temperature of the exhaust gas during active regeneration requires using additional fuel. In addition, the high temperatures experienced during active regeneration contribute to accelerated thermal aging of the SCR element or other downstream catalysts. Finally, the high temperatures also increase insulation requirements, adding size, weight, and cost to the exhaust treatment system.

SUMMARY

Accordingly, a need exists for an exhaust gas treatment system and method with an improved regeneration process that mitigates the disadvantages of conventional active regeneration.

In one aspect, the present disclosure provides an exhaust gas treatment system for an internal combustion engine. The system includes an exhaust gas pathway configured to receive exhaust gas from the internal combustion engine, a diesel particulate filter (DPF) element positioned in the exhaust gas pathway and configured to capture particulate matter from the exhaust gas, and a regenerator operable to increase a temperature of the exhaust gas that passes through the DPF element. The system also includes a controller configured to selectively operate the exhaust gas treatment system in a first mode in which the regenerator is inactive such that a temperature of the exhaust gas is within a first range, a second mode in which the regenerator is activated to increase the temperature of the exhaust gas to a first target temperature beyond the first range, and a third mode in which the regenerator is activated to increase the temperature of the exhaust gas to a second target temperature greater than the first temperature.

In some embodiments, the controller is configured to selectively initiate a regeneration sequence to regenerate the DPF element, and the controller is configured to repeatedly switch only between the second mode and the third mode during the regeneration sequence.

In some embodiments, the first target temperature is between about 300 degrees Celsius and about 450 degrees Celsius.

In some embodiments, the second target temperature is between about 550 degrees Celsius and about 600 degrees Celsius.

In some embodiments, the system includes a diesel oxidation catalyst (DOC) element positioned in the exhaust pathway.

In some embodiments, the regenerator is configured to introduce hydrocarbons into the exhaust gas upstream of the DOC element when the regenerator is active, and the DOC element is configured to exothermically react the hydrocarbons to increase the temperature of the exhaust gas.

In some embodiments, the DPF element includes a filter substrate, and the DOC element includes a precious metal catalyst coating at least a portion of the filter substrate.

In some embodiments, the DOC element is positioned in the exhaust gas pathway upstream of the DPF element.

In some embodiments, the system also includes a selective catalytic reduction (SCR) element positioned in the exhaust gas pathway downstream of the DPF element.

In some embodiments, the regenerator includes at least one of an electric heater or a fuel burner.

The present disclosure provides, in another aspect, an exhaust gas treatment system for an internal combustion engine. The system includes an exhaust gas pathway configured to receive exhaust gas from the internal combustion engine and a first treatment element positioned in the exhaust gas pathway. The first treatment element includes an inlet end, an outlet end downstream of the inlet end, and a filter substrate disposed between the inlet end and the outlet end, the filter substrate including a first portion nearer the inlet end than the outlet end and a second portion downstream of the first portion. The first portion of the filter substrate is at least partially coated with precious metal such that the first portion has a first precious metal density, the second portion of the filter substrate is at least partially coated with precious metal such that the second portion has a second precious metal density, and the first precious metal density is at least 1.2 times greater than the second precious metal density.

In some embodiments, the first precious metal density is between about 2 grams and about 30 grams of precious metal per cubic foot of the filter substrate, and the second precious metal density is between about 1 gram and about 15 grams of precious metal per cubic foot of the filter substrate.

In some embodiments, the inlet end of the first treatment element is coated with precious metal.

In some embodiments, the system also includes a controller configured to selectively initiate a regeneration sequence to regenerate the first treatment element. During the regeneration sequence, the controller is configured to (1) increase a temperature of the exhaust gas within the first treatment element to a first target temperature for a first time period; (2) after the first time period, increase the temperature of the exhaust gas within the first treatment element to a second target temperature greater than the first target temperature for a second time period; and (3) after the second time period, decrease the temperature of the exhaust gas within the first treatment element to the first target temperature for a third time period.

The present disclosure provides, in another aspect, a method of treating exhaust gas from an internal combustion engine as the exhaust gas passes through an exhaust gas pathway. The method includes filtering particulate matter from the exhaust gas with a first treatment element positioned in the exhaust gas pathway and selectively regenerating the first treatment element. Regenerating the first treatment element includes (1) increasing a temperature of the exhaust gas within the first treatment element to a first target temperature for a first time period; (2) after the first time period, increasing the temperature of the exhaust gas within the first treatment element to a second target temperature greater than the first target temperature for a second time period; and (3) after the second time period, decreasing the temperature of the exhaust gas within the first treatment element to the first target temperature for a third time period.

In some embodiments, the first target temperature promotes passive regeneration of the first treatment element.

In some embodiments, the second target temperature promotes active regeneration of the first treatment element.

In some embodiments, the first time period, the second time period, and the third time period are each less than 20 minutes.

In some embodiments, the first treatment element includes a precious metal catalyst, and regenerating the first treatment element includes exothermically reacting hydrocarbons in the exhaust gas in the presence of the precious metal catalyst.

In some embodiments, steps (1), (2), and (3) include varying a concentration of hydrocarbons in the exhaust gas upstream of the first treatment element.

Any of the above referenced aspects of the disclosure can be combined with any one or more of the above referenced aspects of the disclosure. Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
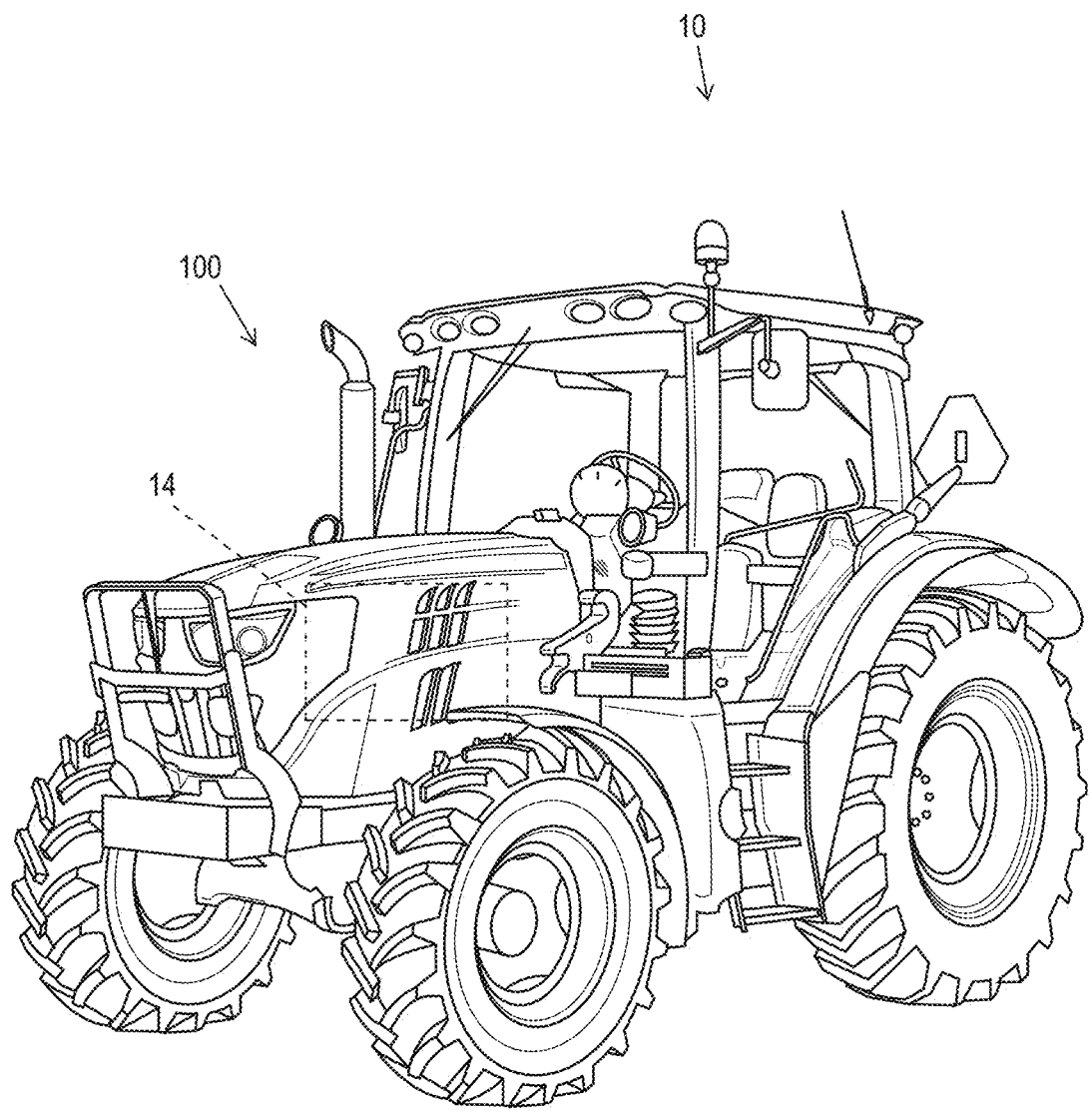
FIG. 1 is a perspective view of a vehicle in which the disclosed exhaust gas treatment system and method with improved regeneration may be implemented.

FIG. 1 illustrates an exemplary vehicle 10 including a diesel-powered internal combustion engine 14 and an exhaust gas treatment system 100 according to one embodiment. The illustrated vehicle 10 is a utility tractor, but the exhaust gas treatment system 100 is not so limited in application and can be used in conjunction with any diesel-powered internal combustion engine. For example, the exhaust gas treatment system 100 can be used in other work vehicles, passenger vehicles, or other equipment powered by a diesel engine (e.g., generators, compressors, pumps, and the like).

Figure 2:
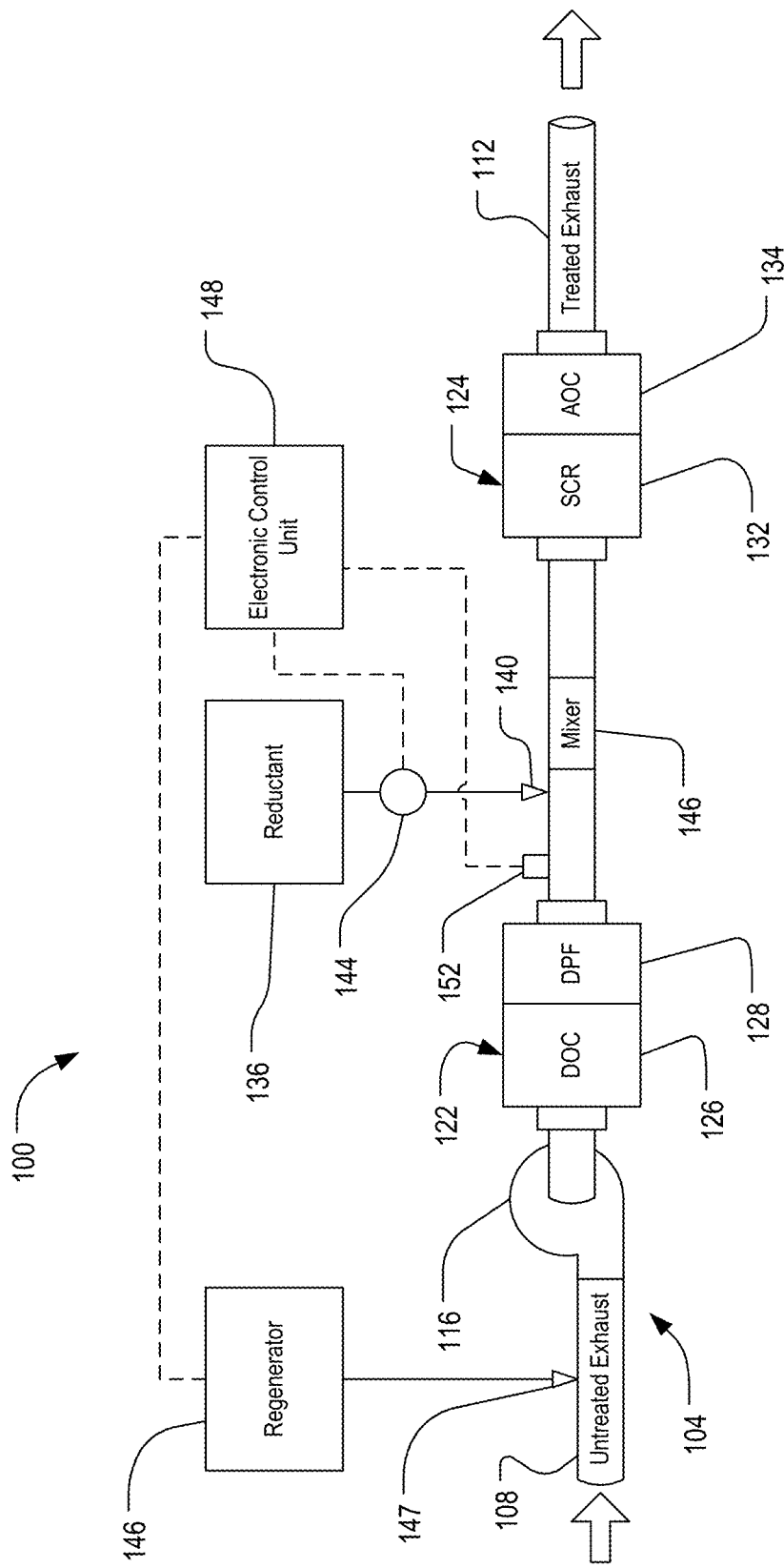
FIG. 2 is a schematic diagram of an exhaust gas treatment system according to one embodiment.

With reference to FIG. 2, the exhaust gas treatment system 100 includes an exhaust pathway 104 (e.g., an exhaust pipe) having an inlet or upstream side 108 and an outlet or downstream side 112. A turbocharger 116 is disposed in the exhaust pathway 104 proximate the inlet 108, but in alternative embodiments, the turbocharger 116 may be omitted. In some embodiments, multiple turbochargers 116 may be provided in the exhaust pathway 104.

A first treatment element 120 and a second treatment element 124 are located in series along the exhaust pathway 104, between the inlet 108 and the outlet 112. Although the second treatment element 124 is located downstream of the first treatment element 120 in the illustrated embodiment, the numeric designations "first," "second," etc. are used herein for convenience and should not be regarded as defining order, quantity, or relative position. In addition, the illustrated first and second treatment elements 120, 124 are located downstream of the turbocharger 116. In other embodiments, however, the turbocharger 116 may be located between the first and second treatment elements 120, 124 or downstream of the treatment elements 120, 124.

In the embodiment illustrated in FIG. 2, the first treatment element 120 includes a diesel oxidation catalyst (DOC) 126 having, for example, a honeycomb support coated with a catalytic material containing one or more precious metals, such as a platinum group metal. The DOC 126 reduces carbon monoxide and hydrocarbons from exhaust passing through the DOC 126. The illustrated first treatment element 122 also includes a diesel particulate filter (DPF) 128 having a filter substrate configured to capture particulate matter and oxidize soot from the exhaust. The DPF 128 is coupled to the DOC 126 downstream of the DOC 126.

Figure 7:
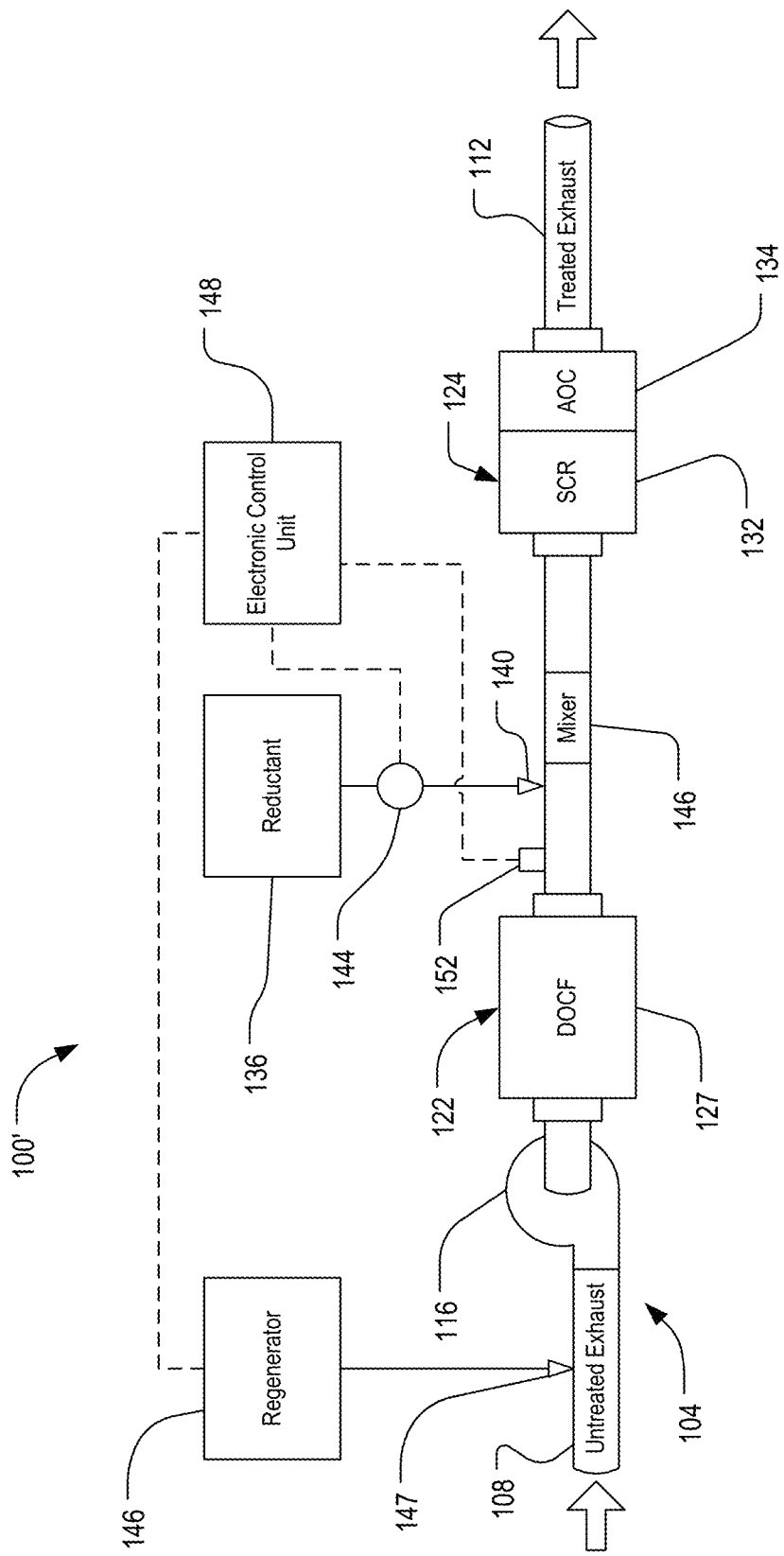
FIG. 7 is a schematic diagram of an exhaust gas treatment system according to another embodiment.

In the illustrated embodiment, the DPF 128 and DOC 126 are combined together in a common housing. Alternatively, the DOC 126 and the DPF 128 may be provided as separate treatment elements. In other embodiments, the filter substrate of the DPF 128 includes a catalytic washcoat to provide a combined diesel oxidation catalyst and diesel particulate filter (DOCF) 127 (FIG. 7). In other embodiments (not shown), the DOC 126 may be omitted and optionally replaced by one or more alternative treatment elements. For example, the DOC 126 may be replaced by a cold start catalyst (CSC), a lean $NO_x$ trap (LNT), a passive $NO_x$ absorber (PNA), and the like.

The second treatment element 124 in the illustrated embodiment includes a selective catalytic reduction (SCR) element 132 and an ammonia oxidation catalyst (AOC) 134. The SCR element 128 includes a catalytic washcoat on a monolithic support material, such as ceramic. The washcoat includes one or more metal catalysts, such as a copper-based catalyst, an iron-based catalyst, or a vanadium-based catalyst. Alternatively, other washcoats (e.g., zeolite-based) may be used.

The SCR element 132 and the AOC 134 are positioned in series, with the AOC 134 located downstream of the SCR element 132. The SCR element 132 reduces $NO_x$ from exhaust gas passing through it. The AOC 134 converts excess ammonia leaving the SCR element 132 to nitrogen and water. The SCR element 132 and the AOC 134 are packaged together within a common housing, as illustrated in FIG. 2. In some embodiments, the AOC 134 may be provided as a separate treatment element positioned downstream of the second treatment element 132. In other embodiments, either or both the SCR element 132 and the AOC 134 may be omitted and optionally replaced by other exhaust treatment elements. Alternatively, the exhaust gas treatment system 100 may include multiple SCR elements 132.

With continued reference to FIG. 2, the exhaust gas treatment system 100 further includes a reductant supply 136 and a reductant injector 140 in fluid communication with the reductant supply 136 via a distributor 144. The reductant supply 136 includes a reservoir for storing a reductant, such as diesel exhaust fluid (DEF) or ammonia. The distributor 144 can include one or more pumps, valves, and the like to selectively control the flow of reductant from the reductant supply 136 to the injector 140. The reductant injector 140 is positioned to introduce reductant into the exhaust gas pathway 104, downstream of the first treatment element 122 (i.e., between the first treatment element 122 and the second treatment element 124). In the illustrated embodiment, a mixer 146 is provided in the exhaust gas pathway 104 downstream of the reductant injector 140. The mixer 146 includes one or more flow affecting features (e.g., fins, vanes etc.) to create swirling or turbulence within the exhaust gas, thereby mixing the injected reductant into the exhaust gas. In other embodiments, the mixer 146 may be omitted.

The exhaust gas treatment system 100 further includes a regenerator 146 operable to selectively increase the temperature of the exhaust gas entering the DPF 128. In the illustrated embodiment, the regenerator 146 includes a dosing device 147 that doses the exhaust gas with hydrocarbons (e.g., unburnt fuel) upstream of the first treatment element 122. The illustrated dosing device 147 is positioned to dose the exhaust gas with hydrocarbons after the exhaust gas has entered the exhaust gas pathway 104. Alternatively, the regenerator 146 may dose additional hydrocarbons into the cylinders of the engine 14 (FIG. 1), and the regenerator 146 may be a part of the fuel system of the vehicle 10.

The DOC 126 is configured to exothermically convert hydrocarbons in the exhaust gas to carbon dioxide and water, which raises the temperature of the exhaust gas as it passes through the DOC 126 and into the DPF 128. Accordingly, the illustrated regenerator 146 is operable to control the temperature of the exhaust gas entering the DPF 128 by controlling the concentration of hydrocarbons introduced into the exhaust gas pathway 104.

In other embodiments, the regenerator 146 can include any other device for selectively increasing the temperature of the exhaust gas entering the DPF 128. For example, in some embodiments, the regenerator 146 includes a burner. In other embodiments, the regenerator 146 includes an electric heater.

An electronic control unit (ECU 148) actively controls various aspects of the operation of the exhaust gas treatment system 100. A sensor 152 is communicatively coupled to the ECU 148 to provide feedback to the ECU 148 indicative of an operating parameter of the exhaust gas treatment system 100. For example, in the illustrated embodiment, the sensor 152 is a temperature sensor that provides feedback to the ECU 148 indicative of a temperature of the exhaust gas exiting the first treatment element 122. Alternatively, the sensor 152 may measure the temperature of the exhaust gas within the first treatment element 122 (e.g., at the inlet of the DPF 128). In some embodiments, the temperature of the exhaust gas entering the DPF 128 is correlated from the temperature measured by the sensor 152.

The sensor 152 may be a thermistor, thermocouple, resistance temperature detector, infrared sensor, or any other sensor suitable for measuring the temperature of the exhaust gas. All or a portion of the temperature sensor 152 may extend into the exhaust gas pathway 104 so as to be directly exposed to exhaust gas. Alternatively, the sensor 152 may be located outside the exhaust gas pathway 104 and measure the temperature of the exhaust gas indirectly (e.g., by measuring the temperature of the exhaust pipe). Other sensor(s) may be provided to sense other operating parameters of the system 100, including but not limited to $NO_x$ concentration, exhaust flow rate, pressure, ash-loading, ammonia concentrations, and the like at one or more points along the exhaust pathway 104 and provide feedback to the ECU 148 indicative of the performance of the exhaust gas treatment system 100.

Figure 3:
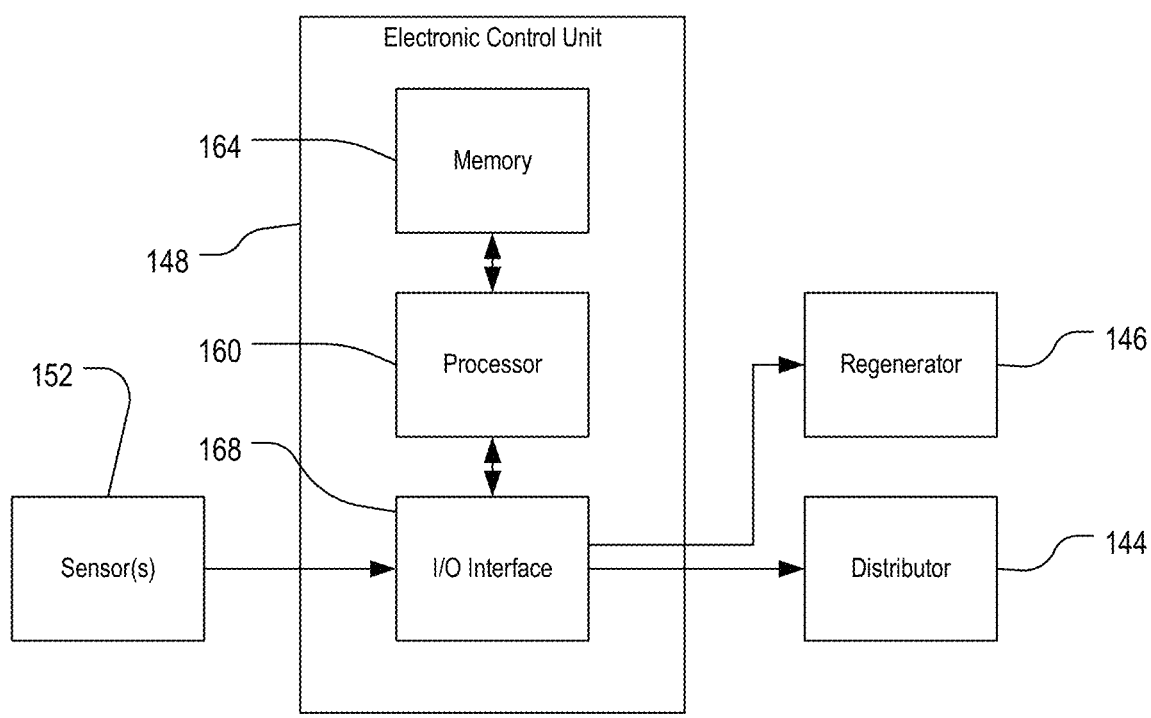
FIG. 3 is a block diagram of an electronic control unit of the exhaust gas treatment system of FIG. 2.

FIG. 3 illustrates an example of the ECU 148 for control of the exhaust gas treatment system 100. The ECU 148 includes a plurality of electrical and electronic components that provide power, operational control, and protection to the components and modules within the ECU 148. In particular, the ECU 148 includes, among other things, an electronic processor 160 (e.g., a programmable microprocessor, microcontroller, or similar device), non-transitory, machine-readable memory 164, and an input/output interface 168. The electronic processor 160 is communicatively coupled to the memory 164 and configured to retrieve from memory 164 and execute, among other things, instructions related to the control processes and methods described herein. In other embodiments, the ECU 148 includes additional, fewer, or different components. In the illustrated embodiment, the ECU 148 is communicatively coupled to the sensor 152, the power supply 138, and the distributor 144. The ECU 148 may also be configured to communicate with external systems including, for example, engine controls and/or vehicle controls.

In operation, untreated exhaust from the internal combustion engine 14 (FIG. 1) is directed into the exhaust pathway 104 at the inlet 108 (FIG. 2). The exhaust then flows through the turbocharger 116, which turns a compressor to feed compressed air back to the engine 14. After flowing through the turbocharger 116, the exhaust gas flows into the first treatment element 122.

Figure 4:
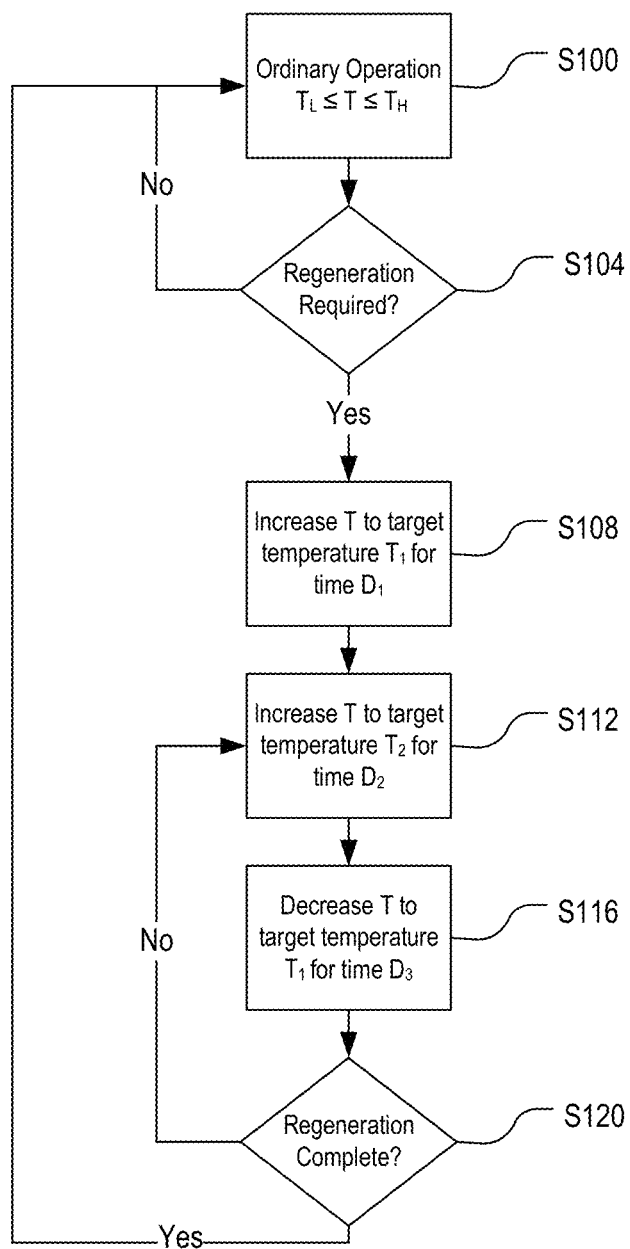
FIG. 4 is a flow diagram illustrating a method of operating the exhaust gas treatment system of FIG. 2.

Referring to FIG. 4, during ordinary operation at step S100, the DOC 126 reduces carbon monoxide and hydrocarbons from the exhaust, and the DPF 128 captures particulate matter from the exhaust. At warm temperatures, the DOC 126 also increases the fraction of $NO_2$ in the exhaust, which promotes oxidation of soot on the filter substrate of the DPF 128 via the passive regeneration reactions of Equations (2) and (3) and promotes $NO_x$ reduction downstream in the SCR element 132. A temperature T of the exhaust gas that flows into the DPF 128 remains between a low operating temperature $T_L$ and a high operating temperature $T_H$. The temperature T may vary between the low operating temperature $T_L$ and the high operating temperature $T_H$ depending on a variety of factors, such as time operating, throttle position, and ambient conditions. For example, in some embodiments, the low operating temperature $T_L$ may be about 25 degrees Celsius, and the high operating temperature $T_H$ may be about 300 degrees Celsius.

The partially treated exhaust gas exits DPF 128 and flows toward the second treatment element 124, which includes the SCR element 132 in the embodiment of FIG. 2. The ECU 148 commands the distributor 144 to supply reductant to the injector 140, and the mixer 146 mixes the reductant evenly within the exhaust gas. The mixture of reductant and exhaust gas then enters the second treatment element 124. The reductant reacts with $NO_x$ in the presence of the catalyst of the SCR element 132 to form nitrogen and water in accordance with Equation (1). Any unreacted reductant is subsequently oxidized in the AOC 134. The treated exhaust then exits the exhaust gas treatment system 100 through the outlet 112.

During the ordinary operation step S100, the regenerator 146 is inactive. That is, the regenerator 146 does not operate to increase the temperature T of the exhaust gas above the high operating temperature $T_H$. The ECU 148 continuously or periodically determines whether regeneration of the DPF 128 is required to eliminate built up soot at step S104. The ECU 148 may determine that regeneration of the DPF 128 is required in response to an elapsed time, an operator command, or sensor feedback (e.g., from a pressure sensor monitoring the pressure drop across the DPF 128).

If the ECU 148 determines the regeneration is required at step S104, the ECU 148 initiates a regeneration sequence at step S108 by activating the regenerator 146. In the illustrated embodiment, the regenerator 146 increases the concentration or proportion of hydrocarbons in the exhaust gas upstream of the DOC 126. The DOC 126 exothermically reacts the hydrocarbons to increase the temperature T of the exhaust gas flowing through the DPF 128 to a first target temperature $T_1$ for a first time period $D_1$. In other embodiments, the regenerator 146 may ignite a burner or energize an electric heating element to increase the temperature T. The first target temperature $T_1$ is above the temperature range $T_L$-$T_H$ that the exhaust gas occupies during ordinary operation. In some embodiments, the first target temperature $T_1$ is between 300 degrees Celsius and 500 degrees Celsius. In some embodiments, the first target temperature $T_1$ is between 350 degrees Celsius and 450 degrees Celsius. The elevated first target temperature $T_1$ increases the rate of the passive regeneration reactions of Equations (2) and (3) to oxidize soot on the DPF 128.

After the first time period $D_1$ has elapsed, the ECU 148 operates the regenerator 146 to further increase the temperature T of the exhaust gas flowing through the DPF 128 to a second target temperature $T_2$ for a second time period $D_2$ at step S112. In the illustrated embodiment, the regenerator 146 increases the temperature T by further increasing the concentration of hydrocarbons in the exhaust gas upstream of the DOC 126. The second target temperature $T_2$ is greater than the first target temperature $T_1$. In some embodiments, the second target temperature $T_2$ is between 500 degrees Celsius and 650 degrees Celsius. In some embodiments, the second target temperature $T_2$ is between 550 degrees Celsius and 600 degrees Celsius. The elevated second target temperature $T_2$ promotes the active regeneration reactions of Equations (4) and (5) to oxidize soot on the DPF 128.

After the second time period $D_2$ has elapsed, at step S116 the ECU 148 operates the regenerator 146 to decrease the temperature T of the exhaust gas flowing through the DPF 128 back to the first target temperature $T_1$ for a third time period $D_3$ (e.g., by reducing the concentration of hydrocarbons in the exhaust gas). Alternatively, the ECU 148 may operate the regenerator 146 to decrease the temperature T of the exhaust gas to any other target temperature between the second target temperature $T_2$ and the high ordinary operating temperature $T_H$. By returning to the first target temperature $T_1$, the ECU 148 again promotes passive regeneration of the DPF 128 for the third time period $D_3$.

At step S120, after the third time period $D_3$ has elapsed, the ECU 148 determines whether regeneration is complete. This determination may be made based on sensor feedback (e.g., based on a measured pressure drop across the DPF 128), a timer, a counter, or the like. If regeneration is not complete, the ECU 148 continues the regeneration sequence by returning to step S112, increasing the temperature T to the second target temperature $T_2$. If the ECU 148 determines that regeneration is complete, the ECU 148 returns the exhaust gas treatment system 100 to ordinary operation at step S100 by deactivating the regenerator 146.

Figure 6:
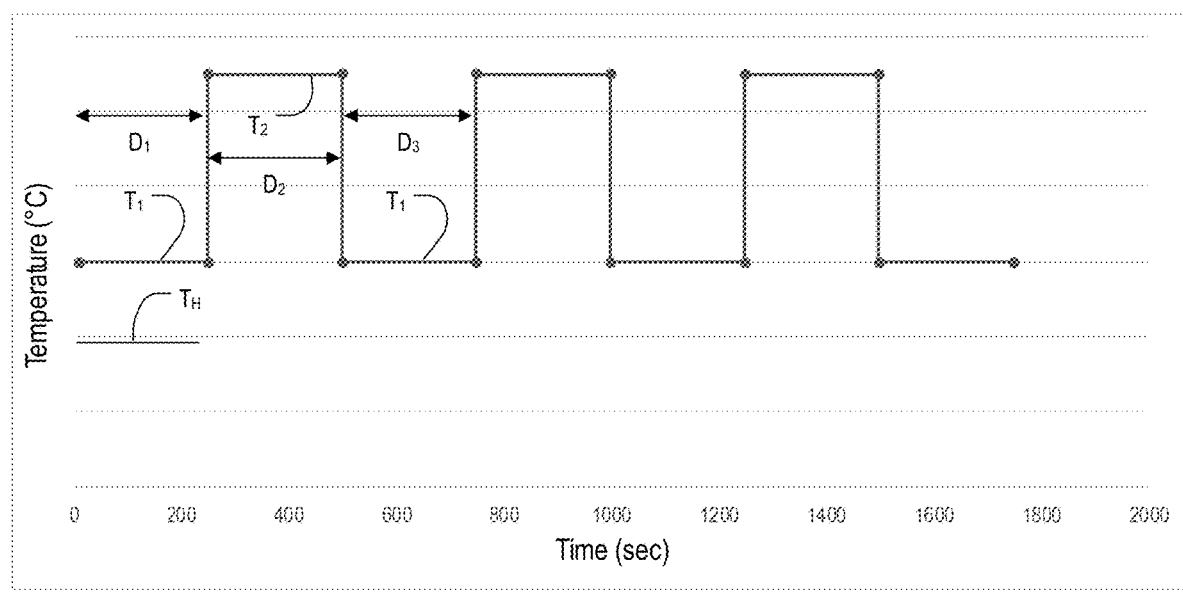
FIG. 6 is a graph illustrating a regeneration sequence of the exhaust gas treatment system of FIG. 2.

As illustrated in FIG. 6, the regeneration sequence described above controls the temperature T of the exhaust gas flowing through the DPF 128 in an oscillatory pattern. In the illustrated embodiment, the temperature T oscillates between the first target temperature $T_1$ and the second target temperature $T_2$ multiple times. The time periods $D_1$, $D_2$, $D_3$ are illustrated as being equal. In other embodiments, the time periods $D_1$, $D_2$, $D_3$ may not be equal and may be varied to provide a desired soot oxidation performance. Each of the time periods $D_1$, $D_2$, $D_3$, is preferably less than 20 minutes, however. In some embodiments, either or both the target temperatures $T_1$, $T_2$ and the time periods $D_1$, $D_2$, $D_3$, may be pre-programed (e.g., stored in memory 164) or may be dynamically calculated or selected by the ECU 148 in response to sensed conditions, such as feedback from the sensor 152.

Figure 5:
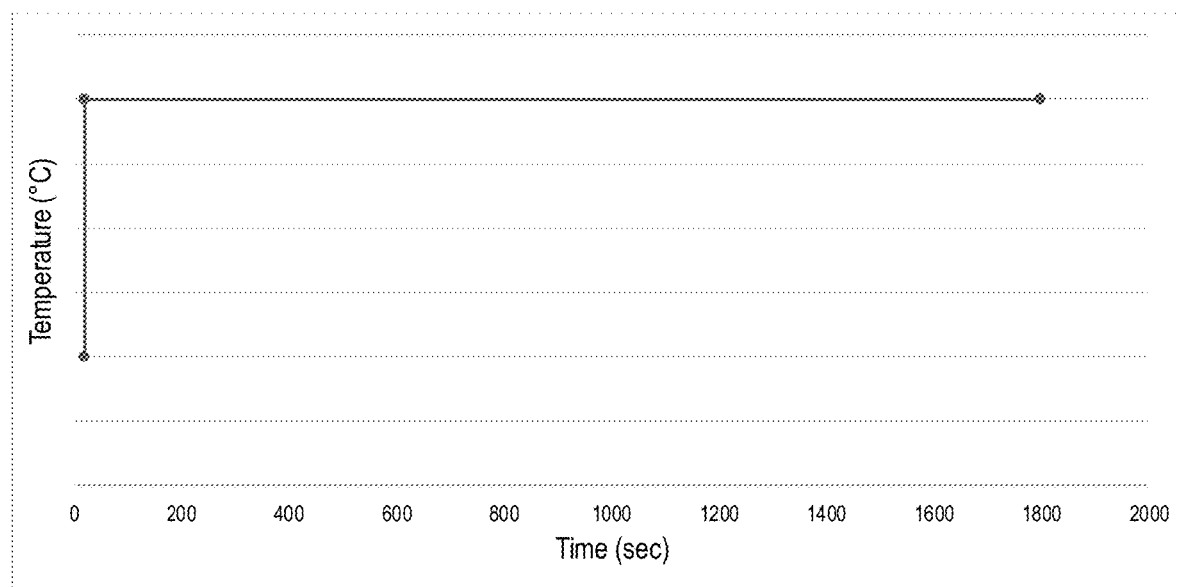
FIG. 5 is a graph illustrating a prior art regeneration sequence.

A typical active regeneration sequence is illustrated in FIG. 5. In the typical active regeneration sequence, the temperature of the exhaust gas flowing through the DPF is held at a high temperature (e.g., $T_2$) for a relatively long time period (e.g., 30-60 minutes). Then, active regeneration is stopped, and the system returns to ordinary operation. Because the temperature is held at a high level for an extended time period, downstream components (e.g., the SCR element, AOC, etc.) heat up to a temperature approaching $T_2$. This may cause thermal aging of the catalyst materials and increased insulation requirements.

Because the regeneration sequence according to the present disclosure oscillates between the temperature $T_2$ and the lower temperature $T_1$, the thermal inertia of the components of the system 10 prevents the components downstream of the DPF 128 from heating up to the temperature $T_2$. That is, during regeneration, the temperature of the downstream components will approach an average temperature between $T_1$ and $T_2$. Thermal aging and insulation requirements are thus reduced.

FIG. 7 illustrates an exhaust gas treatment system 100' according to another embodiment. The exhaust gas treatment system 100' is similar to the exhaust gas treatment system 100 described above with reference to FIG. 2, and features and elements of the exhaust gas treatment system 100' corresponding with features and elements of the exhaust gas treatment system 100 are given identical reference numbers. In addition, the following description focuses on the differences between the exhaust gas treatment system 100' and the exhaust gas treatment system 100.

Instead of having a separate DOC 126 and DPF 128 like the exhaust gas treatment system 100, the first treatment element 122 of the exhaust gas treatment system 100' includes a combined diesel oxidation catalyst and diesel particulate filter (DOCF) 127. The DOCF 127 has a filter substrate with a catalytic washcoat provided on at least a portion of the filter substrate.

Figure 8:
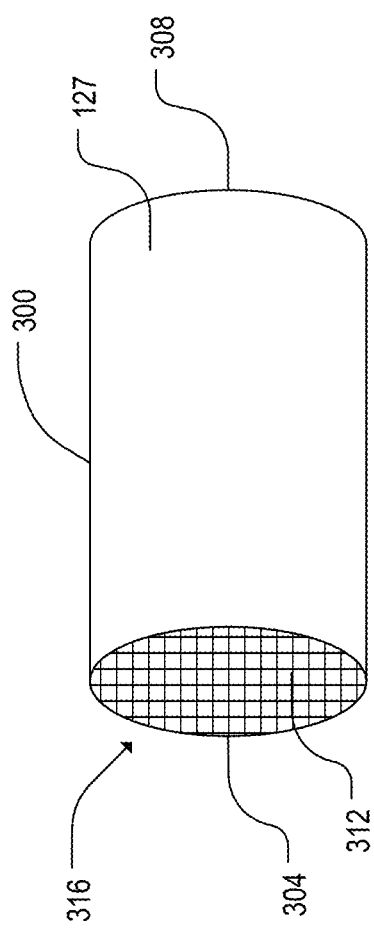
FIG. 8 is a perspective view of a DOCF element of the exhaust gas treatment system of FIG. 7.
Figure 9:
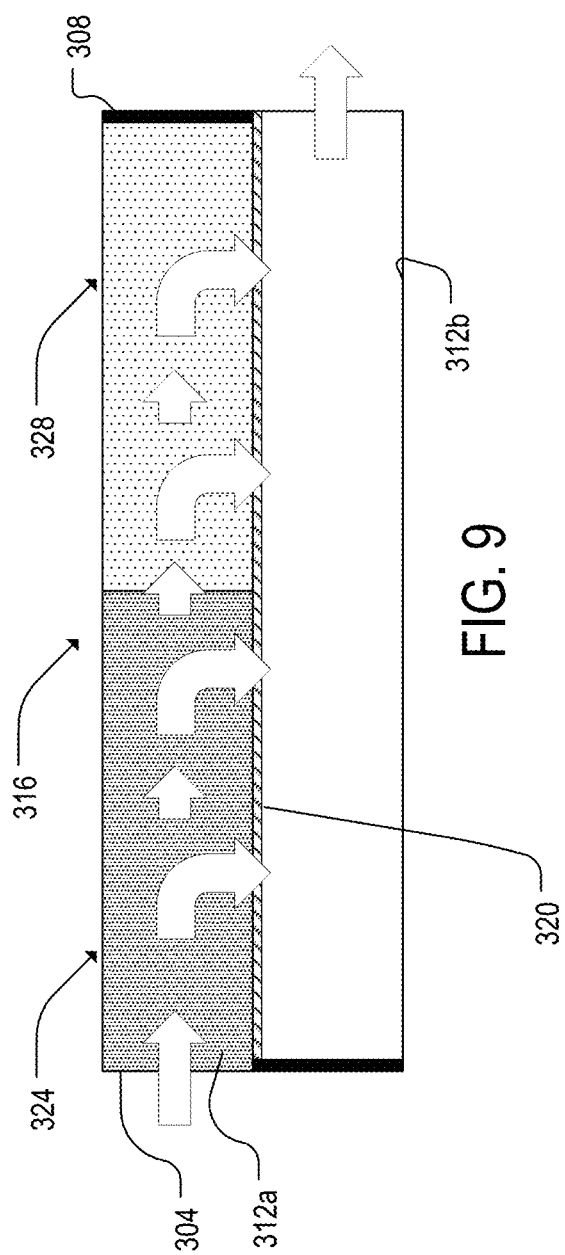
FIG. 9 is a schematic representation of a portion of the DOCF element of FIG. 8.

With reference to FIGS. 8 and 9, the DOCF 127 includes a cylindrical housing 300 with an inlet end 304, an outlet end 308 downstream of the inlet end 304, and a plurality of channels 312 extending between the inlet end 304 and the outlet end 308. The channels 312 are arranged in a grid pattern or honeycomb pattern to form a filter substrate 316 of the DOCF 127. Adjacent channels 312 are blocked at alternating ends. That is, the inlet end 304 of a first channel 312a is open to receive exhaust gas flowing along the exhaust gas pathway 104, and the outlet end 308 of the first channel 312a is blocked (FIG. 9). The inlet end 304 of an adjacent second channel 312b is blocked, and the outlet end 308 of the second channel 312b is open to discharge exhaust gas from the DOCF 127.

With continued reference to FIG. 9, a porous wall 320 extends between the inlet end 304 and the outlet end 308 between the adjacent channels 312a, 312b. Accordingly, exhaust gas that enters the inlet end 304 of the first channel 312a is forced through the porous wall 320 and into the second channel 312b before exiting the DOCF 127. The porous wall 320 captures particulate matter from the exhaust gas.

In the illustrated embodiment, the filter substrate 316 includes a first or upstream portion 324 and a second or downstream portion 328. The first portion 324 and the second portion 328 are each at least partially coated with precious metal catalyst material. The first portion 324 is coated to have a first precious metal density, and the second portion 328 is coated to have a second precious metal density. In some embodiments, the first precious metal density is between about 2 grams and about 30 grams of precious metal per cubic foot of filter substrate 316, and the second precious metal density is between about 1 gram and about 15 grams of precious metal per cubic foot of filter substrate 316. In the illustrated embodiment, the first precious metal density is at least 1.2 times greater than the second precious metal density. That is, the first portion 324 includes a greater density of precious metal catalyst material than the second portion 328.

The first portion 324 is shorter in length than the second portion 328. In some embodiments, the first portion 324 is between 1 and 6 inches in length. In some embodiments, the first portion 324 has a length that is less than 25% of the overall length of the DOCF 127. In some embodiments, the first portion 324 has a length that is less than 10% of the overall length of the DOCF 127.

In the illustrated embodiment, the face of the inlet end 304 is also at least partially coated with precious metal catalyst material. In some embodiments, the face of the inlet end 304 has a precious metal density that is at least 1.2 times greater than the second precious metal density. In some embodiments, the face of the inlet end 304 has a precious metal density that is between 2 times and 5 times greater than the second precious metal density.

The exhaust gas treatment system 100' operates generally in the same manner as the exhaust gas treatment system 100 described above. The combined DOCF 127 allows $NO_2$ to be generated and used within the DOCF 127 for passive regeneration of the filter substrate 316. Because the first portion 324 includes a greater density of precious metal catalyst material, a greater amount of heat is generated near the inlet end 304 of the DOCF 127 when the catalyst material exothermically reacts hydrocarbons in the passing exhaust gas.

The oscillating regeneration sequence of the exhaust gas treatment system 100' is particularly advantageous to regenerate the filter substrate 316 of the DOCF 127. In particular, when the temperature T is at the first target temperature $T_1$, the DOCF 127 generates additional $NO_2$ due to the higher precious metal loading in the first portion 324 of the DOCF 127. This promotes passive regeneration of the filter substrate 316. The catalyzed face of the inlet end 304 also promotes passive regeneration of soot that may accumulate on the inlet end 304, avoiding face plugging that may occur with typical DOC or DPF elements.

Various features of the disclosure are set forth in the following claims.

What is claimed is:

1. An exhaust gas treatment system for an internal combustion engine, the system comprising:
   an exhaust gas pathway configured to receive exhaust gas from the internal combustion engine;
   a diesel particulate filter (DPF) element positioned in the exhaust gas pathway, the DPF element configured to capture particulate matter from the exhaust gas;
   a regenerator operable to increase a temperature of the exhaust gas that passes through the DPF element; and
   a controller configured to selectively operate the exhaust gas treatment system in
      a first mode in which the regenerator is inactive such that a temperature of the exhaust gas is within a first range,
      a second mode in which the regenerator is activated to increase the temperature of the exhaust gas to a first target temperature beyond the first range, and
      a third mode in which the regenerator is activated to increase the temperature of the exhaust gas to a second target temperature greater than the first target temperature,
   wherein the second target temperature is between 500 degrees Celsius and 650 degrees Celsius such that captured particulate matter in the DPF element is oxidized via active regeneration during the third mode, wherein the controller is configured to initiate a regeneration sequence to reduce soot buildup on the DPF element, and wherein the controller is configured to oscillate between the second mode and the third mode multiple times during the regeneration sequence prior to returning to the first mode.

2. The exhaust gas treatment system of claim 1, wherein the first target temperature is between about 300 degrees Celsius and about 450 degrees Celsius.

3. The exhaust gas treatment system of claim 2, wherein the second target temperature is between about 550 degrees Celsius and about 600 degrees Celsius.

4. The exhaust gas treatment system of claim 1, further comprising a diesel oxidation catalyst (DOC) element positioned in the exhaust pathway.

5. The exhaust gas treatment system of claim 4, wherein the regenerator is configured to introduce hydrocarbons into the exhaust gas upstream of the DOC element when the regenerator is active, and wherein the DOC element is configured to exothermically react the hydrocarbons to increase the temperature of the exhaust gas.

6. The exhaust gas treatment system of claim 4, wherein the DPF element includes a filter substrate, and wherein the DOC element includes a precious metal catalyst coating at least a portion of the filter substrate.

7. The exhaust gas treatment system of claim 4, wherein the DOC element is positioned in the exhaust gas pathway upstream of the DPF element.

8. The exhaust gas treatment system of claim 1, further comprising a selective catalytic reduction (SCR) element positioned in the exhaust gas pathway downstream of the DPF element.

9. The exhaust gas treatment system of claim 1, wherein the regenerator includes at least one of an electric heater or a burner.

10. The exhaust gas treatment system of claim 1, wherein the DPF element includes
an inlet end,
an outlet end downstream of the inlet end, and
a filter substrate disposed between the inlet end and the outlet end, the filter substrate including a first portion nearer the inlet end than the outlet end and a second portion downstream of the first portion,
wherein the first portion of the filter substrate is at least partially coated with precious metal such that the first portion has a first precious metal density,
wherein the second portion of the filter substrate is at least partially coated with precious metal such that the second portion has a second precious metal density, and
wherein the first precious metal density is at least 1.2 times greater than the second precious metal density.

11. The exhaust gas treatment system of claim 10, wherein the first precious metal density is between about 2 grams and about 30 grams of precious metal per cubic foot of the filter substrate, and wherein the second precious metal density is between about 1 gram and about 15 grams of precious metal per cubic foot of the filter substrate.

12. The exhaust gas treatment system of claim 10, wherein the inlet end of the DPF element is coated with precious metal.

13. A method of treating exhaust gas from an internal combustion engine as the exhaust gas passes through an exhaust gas pathway, the method comprising:
filtering particulate matter from the exhaust gas with a first treatment element positioned in the exhaust gas pathway; and
selectively regenerating the first treatment element, wherein regenerating the first treatment element includes
(1) increasing a temperature of the exhaust gas within the first treatment element to a first target temperature for a first time period to oxidize particulate matter on the first treatment element via passive regeneration during the first time period,
(2) after the first time period, increasing the temperature of the exhaust gas within the first treatment element to a second target temperature greater than the first target temperature for a second time period to oxidize particulate matter on the first treatment element via active regeneration during the second time period,
(3) after the second time period, decreasing the temperature of the exhaust gas within the first treatment element to the first target temperature for a third time period to oxidize particulate matter on the first treatment element via passive regeneration during the third time period, and
(4) after the third time period and prior to decreasing the temperature of the exhaust gas within the first treatment element below the first target temperature, increasing the temperature of the exhaust gas within the first treatment element to a third target temperature greater than the first target temperature for a fourth time period to oxidize particulate matter on the first treatment element via active regeneration during the fourth time period.

14. The method of claim 13, wherein the first time period, the second time period, and the third time period are each less than 20 minutes.

15. The method of claim 13, wherein the first treatment element includes a precious metal catalyst, and wherein regenerating the first treatment element includes exothermically reacting hydrocarbons in the exhaust gas in the presence of the precious metal catalyst.

16. The method of claim 15, wherein steps (1), (2), and (3) include varying a concentration of hydrocarbons in the exhaust gas upstream of the first treatment element.

17. The method of claim 13, wherein the third target temperature is equal to the second target temperature.

* * * * *